United States Patent
Kuroda

(10) Patent No.: US 9,823,600 B2
(45) Date of Patent: Nov. 21, 2017

(54) SEMICONDUCTIVE ROLLER

(71) Applicant: SUMITOMO RUBBER INDUSTRIES, LTD., Kobe-shi, Hyogo (JP)

(72) Inventor: Kenichi Kuroda, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 301 days.

(21) Appl. No.: 14/611,669

(22) Filed: Feb. 2, 2015

(65) Prior Publication Data

US 2015/0234314 A1    Aug. 20, 2015

(30) Foreign Application Priority Data

Feb. 17, 2014    (JP) ................. 2014-027744

(51) Int. Cl.
*C08L 9/00* (2006.01)
*C08L 9/02* (2006.01)
*G03G 15/08* (2006.01)

(52) U.S. Cl.
CPC ............ *G03G 15/0808* (2013.01); *C08L 9/00* (2013.01); *C08L 9/02* (2013.01); *G03G 15/0818* (2013.01)

(58) Field of Classification Search
None
See application file for complete search history.

(56) References Cited

U.S. PATENT DOCUMENTS

| | | | |
|---|---|---|---|
| 6,287,246 | B1 | 9/2001 | Yoshii et al. |
| 2002/0142134 | A1* | 10/2002 | Masuda ............ G03G 15/0233 428/141 |
| 2006/0269237 | A1* | 11/2006 | Ando ................ G11B 27/034 386/338 |
| 2007/0243984 | A1 | 10/2007 | Mizumoto |
| 2015/0087488 | A1 | 3/2015 | Kang et al. |

FOREIGN PATENT DOCUMENTS

| | | |
|---|---|---|
| JP | 1-252979 A | 10/1989 |
| JP | 10-87897 A | 4/1998 |
| JP | 2000-147899 A | 5/2000 |
| JP | 2000-221774 A | 8/2000 |
| JP | 2000-338773 A | 12/2000 |
| JP | 2004-198745 A | 7/2004 |
| JP | 2006-258932 A | 9/2006 |
| JP | 2007-286236 A | 11/2007 |
| JP | 2008-33308 A | 2/2008 |
| JP | 2010-266512 A | 11/2010 |
| JP | 2013-97117 A | 5/2013 |

* cited by examiner

*Primary Examiner* — Sheeba Ahmed
(74) *Attorney, Agent, or Firm* — Birch, Stewart, Kolasch & Birch, LLP

(57) ABSTRACT

A semiconductive roller of the present invention includes a crosslinked product of a rubber composition containing just the two types of rubber of butadiene rubber and epichlorohydrin rubber as rubber components.

10 Claims, 1 Drawing Sheet

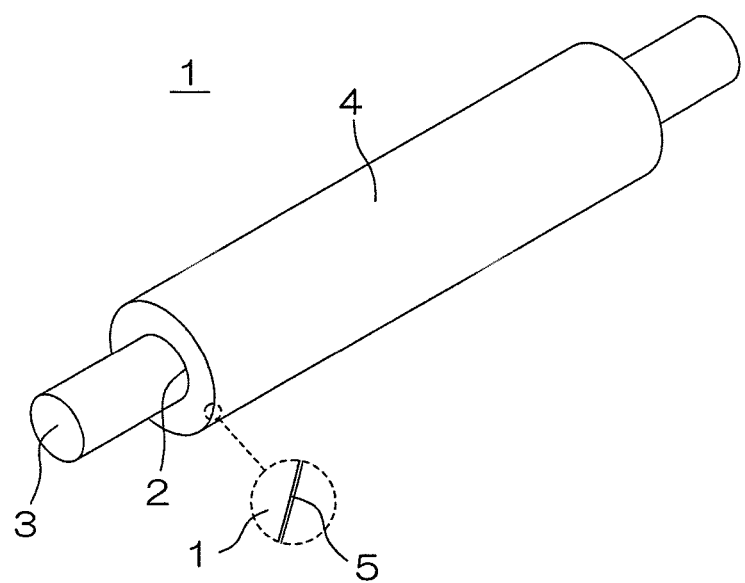

SEMICONDUCTIVE ROLLER

CROSS-REFERENCE TO RELATED APPLICATIONS

The present application corresponds to Japanese Patent Application No. 2014-027744 filed on Feb. 17, 2014 in the Japan Patent Office, and the entire disclosure of this application is incorporated herein by reference.

FIELD OF THE INVENTION

The present invention relates to a semiconductive roller.

BACKGROUND ART

In any of various image forming apparatuses using an electrophotographic method, such as a laser printer, electrostatic copier, plain-paper facsimile apparatus, or a multifunction printer combining the above, a developing roller is used. The developing roller develops an electrostatic latent image, formed on a surface of a photoreceptor, into a toner image by means of a toner.

In order to answer various needs regarding the developing roller, the defining of its arrangement, characteristics, etc., from various viewpoints is being examined.

For example, in Patent Document 1 (Japanese Patent Application Publication No. 2008-33308), a surface treatment solution, containing an isocyanate compound, is impregnated into a surface layer portion of a conductive elastic layer, constituted by blending a conductivity imparting agent in a rubber base material, to form a predetermined surface-treated layer to perform image forming with stability. A curve formed by a Cole-Cole plot (complex impedance plot), indicating the relationship between a resistance component $Zr$ ($\Omega$), computed from the impedance $Z$ ($\Omega$) and the phase difference ($\theta$), and a capacitive reactance component $Zc$ ($\Omega$), of the developing roller is thereby made to substantially have the form of a single arc. That is, an adjustment such that a single peak is exhibited is examined.

With such a developing roller, the conductive elastic layer and the surface-treated layer have the same electrical characteristics and function electrically as a single layer.

In Patent Document 2 (Japanese Patent Application Publication No. 1-252979) is examined the arranging of a developing roller by forming a conductive layer, having a polyurethane resin as a main component and a resistance value of not more than $10^{10}$ $\Omega \cdot cm$, on an outer peripheral surface of an elastic body layer constituted of an oil-resistant rubber with a type A hardness (JIS K6301) of not more than 40° and a resistance value of not more than $10^{10}$ $\Omega \cdot cm$.

It is presumed that with this arrangement, exchange of charges between elastic body layer and the conductive layer is quickened.

BRIEF SUMMARY OF THE INVENTION

In a developing system using a nonmagnetic, single-component toner, a charge level rises to a predetermined value at the instant at which the toner passes between a developing roller and a restricting member upon being carried in accordance with the rotation of the developing roller. Moreover, the charged toner must be held reliably on an outer peripheral surface of the developing roller by an image force. The developing roller is thus required to be capable of imparting a high charge amount (toner charge amount) to the toner and exhibit satisfactory toner retention due to image force.

However, according to a study by the inventor of the present application, it was found that the developing roller according to Patent Document 1 cannot meet the above requirements sufficiently, especially when used in combination with a positively-charged type, nonmagnetic, single-component toner.

It was also found that with the developing roller according to Patent Document 2, both the charge level of the toner and the toner retention due to image force are decreased due to the conductive layer being lower in resistance value than the elastic body layer and therefore the above requirements cannot be met sufficiently.

One embodiment of the present invention provides a semiconductive roller including a crosslinked product of a rubber composition containing just the two types of rubber of butadiene rubber (BR) and epichlorohydrin rubber as rubber components.

According to a study by the inventor of the present application, when the semiconductive roller is used in combination with a positively-charged type, nonmagnetic, single-component toner, it is effective to form the semiconductive roller to be as high as possible in equilibrium potential as determined by a charge exchange test to be described below. Thereby, the roller can be to function as a developing roller that is capable of imparting the toner with a high toner charge amount and is excellent in toner retention due to image force.

BR excels in a function of improving the equilibrium potential in the two-type combination system with epichlorohydrin rubber, which is a conductive rubber.

Therefore with the embodiment of the present invention, the roller is formed of the crosslinked product of the rubber composition containing just the two types of rubber of BR and epichlorohydrin rubber as rubber components. A semiconductive roller can thereby be provided that is capable of imparting a high toner charge amount to a toner especially when used as a developing roller in combination with a positively-charged type, nonmagnetic, single-component toner and also functioning as a developing roller that is excellent in toner retention due to image force.

BRIEF DESCRIPTION OF THE DRAWINGS

FIG. 1 is a perspective view of a semiconductive roller according to one embodiment of the present invention.

DETAILED DESCRIPTION OF EMBODIMENTS

One embodiment of the present invention is a semiconductive roller including a crosslinked product of a rubber composition containing just the two types of rubber of BR and epichlorohydrin rubber as rubber components.

As described above, with the embodiment of the invention, BR of a conductive robber, which functions to improve the equilibrium potential in the two-type combination system with epichlorohydrin rubber, is used as a rubber component in combination with just the epichlorohydrin rubber. A semiconductive roller can thereby be provided that is capable of imparting a high toner charge amount to a toner especially when used as a developing roller in combination with a positively-charged type, nonmagnetic, single-component toner and also functioning as a developing roller that is excellent in toner retention due to image force.

Specifically, the semiconductive roller is preferably manufactured by preparing a rubber composition by blending a crosslinking component, which crosslinks the rubber components, etc., to the two types of rubber components, molding the rubber composition to a tubular shape, and thereafter crosslinking the rubber composition. Also, to achieve low cost manufacturing with the highest possible productivity and improve durability, compression set, etc., the semiconductive roller is preferably formed to have a non-porous, single-layer structure.

Here, "single-layer structure" indicates that the number of layers constituted of the rubber composition is single and an oxide film, to be described below, is not counted in the number of layers.

<Rubber Components>

As the rubber components, just the two types of rubber of BR and epichlorohydrin rubber are used in combination as described above. However with each of BR and epichlorohydrin rubber, two or more different types may be combined separately.

(BR)

Any of various polymers having a polybutadiene structure and having a crosslinking property may be used as BR. In particular, a high cis BR with a cis-1,4 bond percentage of not less than 90% by mass, which enables the forming of a crosslinked product that is pliable and yet low in compression set, is preferable.

The blending proportion of BR with respect to 100 parts by mass of the total amount of rubber components is preferably not less than 20 parts by mass and not more than 90 parts by mass.

If the blending proportion of BR is less than this range, the effect of using BR in combination with epichlorohydrin rubber to improve the equilibrium potential to impart a high toner charge amount to the toner and improve the toner retention due to image force when combined with a positively-charged type, nonmagnetic, single-component toner becomes insufficient and the toner charge amount decreases so that fogging may occur in a formed image.

Also, if the blending proportion of BR exceeds the above range, the amount of epichlorohydrin rubber decreases relatively. The semiconductive roller thus increases in roller resistance value and when combined with a positively-charged type, nonmagnetic, single-component toner, the density of a solid black portion of a formed image may become insufficient.

(Epichlorohydrin Rubber)

As examples of epichlorohydrin rubber, one type or two or more types among an epichlorohydrin homopolymer, epichlorohydrin-ethylene oxide binary copolymer (ECO), epichlorohydrin-propylene oxide binary copolymer, epichlorohydrin-allyl glycidyl ether binary copolymer, epichlorohydrin-ethylene oxide-allyl glycidyl ether ternary copolymer (GECO), epichlorohydrin-propylene oxide-allyl glycidyl ether ternary copolymer, epichlorohydrin-ethylene oxide-propylene oxide-allyl glycidyl ether quaternary copolymer, etc., can be cited.

Among these, a copolymer containing ethylene oxide and especially ECO and/or GECO is preferable as epichlorhydrin rubber.

In either of these copolymers, the ethylene oxide content is preferably not less than 30 mole % and especially preferably not less than 60 mole % and preferably not more than 95 mole % and especially preferably not more than 80 mole %.

The ethylene oxide acts to decrease the roller resistance value of the semiconductive roller. However, if the ethylene oxide content is less than the above range, the function cannot be obtained sufficiently and it may not be possible to decrease the resistance value of the semiconductive roller sufficiently.

On the other hand if the ethylene oxide content exceeds the above range, crystallization of the ethylene oxide occurs, causing inhibition of segmental motion of the molecular chain so that the roller resistance value of the semiconductive roller tends to increase instead.

Also, increase of viscosity may occur when the rubber components and other components are kneaded to prepare the rubber composition that is to be the base of the semiconductive roller or when the prepared rubber composition before crosslinking is heated and melted to be molded into the tubular shape and the workability of these processes may therefore decrease. Further, the hardness of the semiconductive roller after crosslinking may increase.

In ECO, the epichlorohydrin content is the remaining amount with respect to the ethylene oxide content. That is, the epichlorohydrin content is preferably not less than 5 mole % and especially preferably not less than 20 mole % and preferably not more than 70 mole % and especially preferably not more than 40 mole %.

Also in GECO, the allyl glycidyl ether content is preferably not less than 0.5 mole % and especially preferably not less than 2 mole % and preferably not more than 10 mole % and especially preferably not more than 6 mole %.

Allyl glycidyl ether itself functions as a side chain to secure a free volume and thereby acts to suppress crystallization of ethylene oxide and decrease the roller resistance value of the semiconductive roller. However, if the allyl glycidyl ether content is less than the above range, this action cannot be provided and it may not be possible to decrease the roller resistance value of the semiconductive roller sufficiently.

On the other hand, allyl glycidyl ether functions as a crosslinking point in the process of crosslinking of GECO and therefore if the allyl glycidyl ether content exceeds the above range, the crosslinking density of GECO increases and segmental motion of the molecular chain is inhibited. Consequently, the roller resistance value of the semiconductive roller tends to increase. Also, the semiconductive roller may be lowered in tensile strength, fatigue characteristics, flex resistance, etc.

In GECO, the epichlorohydrin content is the remaining amount with respect to the ethylene oxide content and the allyl glycidyl ether content. In particular, the epichlorohydrin content is preferably not less than 4.5 mole % and especially preferably not less than 15 mole % and preferably not more than 65 mole % and especially preferably not more than 40 mole %.

As GECO, in addition to the copolymer in the strict sense in which the three types of monomers described above are copolymerized, there is also known a modification product obtained by modification of epichlorohydrin-ethylene oxide copolymer (ECO) by allyl glycidyl ether, and this modification product may also be used as GECO in the present embodiment.

The blending proportion of epichlorohydrin rubber is the remaining amount with respect to the blending proportion of BR described above.

<Crosslinking Component>

A crosslinking agent, an accelerator, etc., can be cited as a crosslinking component that crosslinks the two types of rubber components.

As examples of the crosslinking agent, one type or two or more types among a sulfur-based crosslinking agent, thiourea-based crosslinking agent, triazine derivative-based crosslinking agent, peroxide-based crosslinking agent, and any of various monomers, etc., can be cited. Among these, a sulfur-based crosslinking agent is preferable.

As examples of the sulfur-based crosslinking agent, powdered sulfur, an organic sulfur-containing compound, etc., can be cited. Among these, as example of an organic sulfur-containing compound, tetramethylthiuram disulfide, N, N-dithiobismorpholine, can be cited. Sulfur such as powdered sulfur is especially preferable.

The blending proportion of sulfur with respect to 100 parts by mass of the total amount of rubber components is preferably not less than 0.2 parts by mass and especially preferably not less than 1 parts by mass and preferably not more than 5 parts by mass and especially preferably not more than 3 parts by mass.

If the blending proportion is less than this range, the crosslinking rate of the rubber composition as a whole is slow so that the time required for crosslinking becomes long and the semiconductive roller may be lowered in productivity. If the range is exceeded, the compression set of the semiconductive roller after crosslinking is large or excess sulfur may bloom out on the outer peripheral surface of the semiconductive roller.

As examples of the accelerator, one type or two or more types among an inorganic accelerator such as slaked lime, magnesia (MgO), and litharge (PbO), an organic accelerator, etc., can be cited.

As examples of the organic accelerator, one type or two or more types among a guanidine-based accelerator such as 1,3-di-o-tolylguanidine, 1,3-diphenylguanidine, 1-o-tolylbiguanide, and di-o-tolyl guanidine salt of dicatechol borate; a thiazole-based accelerator such as 2-mercaptobenzothiazole and di-2-benzothiazyl disulfide; a sulfenamide-based accelerator such as N-cyclohexyl-2-benzothiazyl and sulfenamide; a thiuram-based accelerator such as tetramethylthiuram monosulfide, tetramethylthiuram disulfide, tetraethylthiuram disulfide, and dipentamethylenethiuram tetrasulfide; a thiourea-based accelerator such as ethylene thiourea, tetramethylthiourea, and trimethylthiourea; can be cited.

As the accelerator, one type or two or more types of the optimal accelerator may be selected from among the various accelerators and used in accordance with the type of crosslinking agent to be combined with. In particular, an accelerator differs in mechanism of crosslinking acceleration according to type and it is thus preferable to use two or more types in combination. Although the blending proportion of each individual accelerator to be used in combination may be set as suited, the blending proportion with respect to 100 parts by mass of the total amount of rubber components is preferably not less than 0.1 parts by mass and not more than 2 parts by mass.

A supplement accelerator may be blended further as a crosslinking component.

As examples of the supplement accelerator, one type or two or more types among a metal compound such as zinc white (zinc oxide); a fatty acid such as stearic acid, oleic acid, and cottonseed fatty acid; and other conventionally known supplement accelerators can be cited.

The blending proportion of the supplement accelerator may be set as suited in accordance with the types and combination of the rubber components, the types and combination of the crosslinking agent and the accelerator, etc.

<Others>

Various additives may further be added as necessary to the rubber composition. An acid accepting agent, plasticizer, auxiliary processing agent, antidegradant, filler, anti-scorch agent, ultraviolet absorber, lubricant, pigment, anti-static agent, flame retardant, neutralizer, nucleating agent, co-crosslinking agent, etc., can be cited as examples of additives.

Among the above, the acid accepting agent functions to prevent a chlorine-based gas, generated from epichlorohydrin rubber and CR during the crosslinking of the rubber components, from remaining inside the semiconductive roller and thereby causing inhibition of crosslinking, contamination of the photoreceptor, etc.

As the acid accepting agent, any of various substances that act as an acid acceptor may be used. Among these, a hydrotalcite or magsarat, which is excellent in dispersibility, is preferable and a hydrotalcite is especially preferable.

Also, a high acid accepting effect can be obtained by using the hydrotalcite, etc., in combination with magnesium oxide or potassium oxide to prevent the contamination of the photoreceptor more reliably.

The blending proportion of the acid accepting agent with respect to 100 parts by mass of the total amount of rubber components is preferably not less than 0.2 parts by mass and especially preferably not less than 0.5 parts by mass and preferably not more than 5 parts by mass and especially preferably not more than 3 parts by mass.

If the blending proportion is less than this range, the effect of blending in the acid accepting agent may not be obtained sufficiently. When the range is exceeded, the hardness of the semiconductive roller after crosslinking may increase.

Any of various plasticizers such as dibutyl phthalate (DBP), dioctyl phthalate (DOP), and tricresyl phosphate and any of various waxes such as a polar wax can be cited as examples of the plasticizer. Stearic acid and other fatty acids can be cited as the auxiliary processing agent.

The blending proportion of the plasticizer and/or the auxiliary processing agent with respect to 100 parts by mass of the total amount of rubber components is preferably not more than 5 parts by mass. This is in order to prevent the contamination of the photoreceptor, for example, during installation onto the image forming apparatus and during operation. In terms of this object, use of a polar wax among the plasticizers is especially preferable.

Any of various age resistors, antioxidants, etc., can be cited as examples of the antidegradant.

Among these, the antioxidant acts to reduce the environmental dependence of the roller resistance value of the semiconductive roller and suppress increase of the roller resistance value while electricity is supplied continuously. Nickel diethyldithiocarbamate (Nocrac (registered trademark) NEC-P manufactured by Ouchi Shinko Chemical Industrial Co., Ltd.), nickel dibutyldithiocarbamate (Nocrac NBC manufactured by Ouchi Shinko Chemical Industrial Co., Ltd.), etc., can be cited as examples of the antioxidant.

As examples of the filler, one type or two or more types among zinc oxide, silica, carbon, carbon black, clay, talc, calcium carbonate, magnesium carbonate, aluminum hydroxide, etc., can be cited.

The mechanical strength, etc., of the semiconductive roller can be improved by blending in the filler.

The blending proportion of the filler with respect to 100 parts by mass of the total amount of rubber components is preferably not less than 5 parts by mass and preferably not more than 25 parts by mass and especially preferably not more than 20 parts by mass.

Also, conductive carbon black may be blended as the filler to impart the semiconductive roller with electronic conductivity.

HAF is preferable as the conductive carbon black. HAF can be dispersed uniformly in the rubber composition and therefore enables an electronic conductivity that is as uniform as possible to be imparted to the semiconductive roller.

The blending proportion of the conductive carbon black with respect to 100 parts by mass of the total amount of rubber components is preferably not less than 1 parts by mass and not more than 3 parts by mass.

As examples of the anti-scorch agent, one type or two or more types among N-cyclohexylthiophthalimide, phthalic anhydride, N-nitrosodiphenylamine, 2,4-diphenyl-4-methyl-1-pentene, etc., can be cited. N-cyclohexylthiophthalimide is especially preferable.

The blending proportion of the anti-scorch agent with respect to 100 parts by mass of the total amount of rubber components is preferably not less than 0.1 parts by mass and not more than 5 parts by mass and especially preferably not more than 1 part by mass.

The co-crosslinking agent refers to a component that provides actions of crosslinking with itself and also undergoing crosslinking reactions with the rubber components to polymerize the entirety.

As examples of the co-crosslinking agent, one type or two or more types among an ethylenic unsaturated monomer, represented by a methacrylic acid ester or a metal salt of methacrylic acid or acrylic acid, etc., a polyfunctional polymer that uses functional groups of 1,2-polybutadiene, a dioxime, etc., can be cited.

Among the above, one type or two or more types among
(a) a monocarboxylic acid such as acrylic acid, methacrylic acid and crotonic acid,
(b) a dicarboxylic acid such as maleic acid, fumaric acid, and itaconic acid,
(c) an ester or anhydride of an unsaturated carboxylic acid among (a) and (b),
(d) a metal salt of (a) to (c),
(e) an aliphatic conjugate diene such as 1,3-butadiene, isoprene, and 2-chloro-1,3-butadiene,
(f) an aromatic vinyl compound such as styrene, α-methylstyrene, vinyltoluene, ethylvinylbenzene, and divinylbenzene,
(g) a vinyl compound having a heterocycle such as triallyl isocyanurate, triallyl cyanurate, and vinylpyridine, and
(h) other compounds, including cyanated vinyl compounds such as (meth)acrylonitrile, and α-chloroacrylonitrile, and acrolein, formylsterol, vinylmethylketone, vinylethylketone, and vinyl butyl ketone, etc.
can be cited as examples of the ethylenic unsaturated monomer.

As the (c) ester of unsaturated carboxylic acid, an ester of a monocarboxylic acid is preferable.

As examples of the ester of monocarboxylic acid, one type or two or more types among an alkyl ester of (meth)acrylic acid such as methyl (meth)acrylate, ethyl (meth)acrylate, n-propyl (meth)acrylate, i-propyl (meth)acrylate, n-butyl (meth)acrylate, i-butyl (meth)acrylate, n-pentyl (meth)acrylate, i-pentyl (meth)acrylate, n-hexyl (meth)acrylate, cyclohexyl (meth)acrylate, 2-ethylhexyl (meth)acrylate, octyl (meth)acrylate, i-nonyl (meth)acrylate, tert-butylcyclohexyl (meth)acrylate, decyl (meth)acrylate, dodecyl (meth)acrylate, hydroxymethyl (meth)acrylate, and hydroxyethyl (meth)acrylate;

an aminoalkyl ester of (meth)acrylic acid such as aminoethyl (meth)acrylate, dimethylaminoethyl (meth)acrylate, and butylaminoethyl (meth)acrylate;

a (meth)acrylate having an aromatic ring such as benzyl (meth)acrylate, benzoyl (meth)acrylate, and aryl (meth)acrylate;

a (meth)acrylate having an epoxy group such as glycidyl (meth)acrylate, methaglycidyl (meth)acrylate, and epoxycyclohexyl (meth)acrylate;

a (meth)acrylate having any of various functional groups such as N-methylol (meth)acrylamide, γ-(meth)acryloxy-propyltrimethoxysilane, and tetrahydrofurfuryl methacrylate;

a polyfunctional (meth)acrylate such as ethylene glycol di(meth)acrylate, trimethylolpropane tri(meth)acrylate, ethylene dimethacrylate (EDMA), polyethylene glycol dimethacrylate, and isobutylene ethylene dimethacrylate;
can be cited as examples.

A rubber composition containing the respective components described above may be prepared in the same manner as is done conventionally. First, the rubber components are blended at the predetermined proportions and masticated and then the various additives besides the crosslinking component are added and kneading is performed. Lastly, the crosslinking component is added and kneading is performed to obtain the rubber composition. For example, a kneader, a Banbury mixer, extruder, etc., may be used to perform kneading.

<<Semiconductive Roller>>

FIG. 1 is a perspective view of a semiconductive roller according to one embodiment of the present invention.

With reference to FIG. 1, the semiconductive roller 1 of the present example is formed to a tubular shape with a non-porous and single-layer structure from a crosslinked product of the rubber composition and has a shaft 3 inserted and fixed in a central through hole 2.

The shaft 3 is formed integrally from a metal such as aluminum, aluminum alloy, and stainless steel.

The shaft 3 is electrically bonded and mechanically fixed to the semiconductive roller 1, for example, via an adhesive with a conductive property. Or, the shaft 3 has an outer diameter greater than the inner diameter of the through hole 2 and is press-fitted into the through hole 2 to be electrically bonded and mechanically fixed to the semiconductive roller 1. The shaft 3 and the semiconductive roller 1 are thereby made to rotate integrally.

An oxide film 5 may be provided on an outer peripheral surface 4 of the semiconductive roller 1 as shown in enlarged manner in the FIGURE.

When the oxide film 5 is formed, the oxide film 5 functions as a dielectric layer to reduce the dielectric loss tangent of the semiconductive roller 1. Also, in the case of use as a developing roller, the oxide film 5 serves as a low friction layer to further suppress toner attachment.

Moreover, the oxide film 5 can be formed simply by irradiating ultraviolet rays in an oxidizing atmosphere, etc., so that lowering of productivity and increase of manufacturing cost of the semiconductive roller 1 can be suppressed as much as possible. However, the oxide film 5 does not have to be formed.

To manufacture the semiconductive roller 1, first the rubber composition that has been prepared in advance is extrusion-molded to the tubular shape using an extrusion molder, then cut to a predetermined length, and thereafter crosslinked by being pressurized and heated in a vulcanizer.

The crosslinked tubular body is then heated using an oven, etc., to perform secondary crosslinking and then after cooling, polished to a predetermined outer diameter.

The shaft 3 may be fixed by inserting into the through hole 2 at any point from after the cutting of the tubular body to after the polishing.

However, it is preferable to perform the secondary crosslinking and the polishing after first inserting the shaft 3 into the through hole 2 after the cutting. Warping and deformation of the tubular body→semiconductive roller 1 due to expansion/shrinkage during the secondary crosslinking can thereby be prevented. Also by performing polishing while rotating the roller around the shaft 3 as the center, the polishing can be improved in workability and deflection of the outer peripheral surface 4 can be suppressed.

As mentioned above, the shaft 3 of the outer diameter greater than the inner diameter of the through hole 2 may be press-fitted into the through hole 2 or insertion into the through hole 2 of the tubular body before secondary crosslinking may be performed via a thermosetting adhesive with a conductive property.

In the latter case, the thermosetting adhesive hardens at the same time as the tubular body undergoes secondary crosslinking due to heating in the oven so that the shaft 3 becomes electrically bonded and mechanically fixed to the tubular body→semiconductive roller 1.

Also in the former case, the electrical bonding and the mechanical fixing are completed at the same time as the press fitting.

As described above, the oxide film 5 is preferably formed by irradiating ultraviolet rays onto the outer peripheral surface 4 of the semiconductive roller 1 because it can then be formed simply and efficiently. That is, the rubber composition, constituting the outer peripheral surface 4 of the semiconductive roller 1, itself is irradiated with ultraviolet rays of a predetermined wavelength for a predetermined time to form the oxide film 5.

Moreover, the oxide film 5 is formed by the rubber composition, constituting the outer peripheral surface 4 of the semiconductive roller 1, being oxidized in itself described above and therefore does not cause problems such as a conventional coating layer formed by coating on a coating agent and is excellent in uniformity of thickness, surface shape, etc.

In consideration of oxidizing the rubber composition efficiently to form the oxide film 5 with the excellent functions described above, the wavelength of the irradiated ultraviolet rays is preferably not less than 100 nm and preferably not more than 400 nm and especially preferably not more than 300 nm. Also, the irradiation time is preferably not less than 30 seconds and especially preferably not less than 1 minute and preferably not more than 30 minutes and especially preferably not more than 15 minutes.

However, the oxide film 5 may be formed by another method or may be omitted depending on the case.

<Equilibrium Potential>

The semiconductive roller 1 is preferably such that the equilibrium potential determined by the charge exchange test to be described below is not less than 0.3 kV.

If when the equilibrium potential is less than this range, the roller is used as a developing roller in combination with a positively-charged type, nonmagnetic, single-component toner, the effects of imparting a high toner charge amount to the toner and improving the toner retention due to image force become insufficient and the toner charge amount decreases so that fogging may occur in a formed image.

Even in the above range, the equilibrium potential is preferably not less than 1.0 kV and especially preferably not less than 1.5 kV in consideration of further improving the above effects to form an image of satisfactory image quality while avoiding fogging, etc., as much as possible.

Even in the above range, the equilibrium potential is preferably not more than 4.0 kV and especially preferably not more than 3.5 kV.

To adjust the equilibrium potential, the blending proportion of BR in the 100 parts by mass of the total amount of the rubber components is changed as described above. If the oxide film 5 is formed on the outer peripheral surface 4 of the semiconductive roller 1 by irradiation of ultraviolet rays, the equilibrium potential can also be adjusted by adjusting the ultraviolet ray irradiation time.

<Charge Exchange Test>

(Preparation of Toner Tablet)

0.75 g of the positively-charged type, nonmagnetic, single-component toner to be used in combination with the semiconductive roller 1 are weighed out, charged in a 20 mmφ mold, and pressed at 40 kN for 2 minutes to prepare a toner tablet of 2 mm thickness.

(Preparation of Test Pieces)

A rubber composition to be the material of the semiconductive roller 1 is kneaded, molded into a sheet shape and crosslinked under the same conditions as those for manufacturing the semiconductive roller 1 to form a slab sheet of 100 mm length×100 mm width×2 mm thickness, and this is punched out in 10 mmφ pieces to prepare the test pieces.

If the oxide film 5 is to be formed on the outer peripheral surface 4 of the semiconductive roller 1, an oxide film is formed by the same method on the surface of each test piece as well.

For example, if the oxide film 5 of the semiconductive roller 1 is to be formed by irradiation of ultraviolet rays as described above, the test piece is set in the ultraviolet ray irradiation apparatus [PL21-200 manufactured by Sen Lights Co., Ltd.] with the distance from the UV lamp to the test piece being set to the same distance as that in the case of forming the oxide film 5. The oxide film is then formed on the test piece by irradiating ultraviolet rays of the same wavelength as that in the case of forming the oxide film 5.

(Charge Exchange Test)

A toner tablet, with which the electric potential 2.5 mm above the surface (surface potential), measured using a surface electrometer [Model 370 high-speed electrostatic voltmeter, made by Trek Japan K. K.], has been adjusted to a predetermined value, is set, together with a test piece, in a charge exchange test apparatus manufactured by Sumitomo Rubber Industries, Ltd. To adjust the surface potential of the toner tablet, a nylon film is contacted with the toner tablet.

The charge exchange test apparatus is then put in operation and a charge transfer amount (nC) from the test piece to the toner tablet upon putting the toner tablet in contact with the test piece at a contact pressure of 10N for 30 seconds and then releasing the toner tablet is measured using a Faraday cage [TR8031, manufactured by ADC Corp.] and read using a digital electrometer [8252, manufactured by ADC Corp.].

This procedure is performed repeatedly with the toner tablet that is changed in surface potential and the surface potential of the toner tablet at which the charge transfer amount is 0 nC is determined as the equilibrium potential.

Although properly speaking, the surface potential difference between the test piece and the toner tablet must be determined as the equilibrium potential, the test piece made of the rubber composition is semiconductive and does not hold electrostatic charges and it can thus be deemed that the surface potential of the test piece is zero in the test described above. That is, in a simplified manner, the surface potential of the toner tablet can be deemed to be the surface potential difference with respect to the test piece, in other words, the equilibrium potential.

<Others>

The semiconductive roller 1 can favorably be used, for example, as a developing roller that is incorporated in a laser printer or other image forming apparatus using an electrophotographic method and arranged to develop an electrostatic latent image, formed on a surface of a photoreceptor, into a toner image by means of a charged toner, especially a positively-charged type, nonmagnetic, single-component toner.

For example, in the case of use as a developing roller, the thickness of the semiconductive roller 1 is preferably not less than 0.5 mm, more preferably not less than 1 mm, and especially preferably not less than 2 mm and preferably not more than 10 mm, more preferably not more than 7 mm, and especially preferably not more than 5 mm in order to secure an appropriate nip width while realizing compact size and light weight.

The semiconductive roller according to one embodiment of the present invention can favorably be used as the developing roller, etc., in an image forming apparatus using an electrophotographic method such as a laser printer, electrostatic copier, plain-paper facsimile apparatus, or a multi-function printer combining the above. Besides this, the roller may be used as a charging roller, transfer roller, cleaning roller, etc., in the image forming apparatus.

EXAMPLES

Example 1

(Preparation of Rubber Composition)

As rubber components, 80 parts by mass of BR [JSR BR01 manufactured by JSR Corporation; cis-1,4 bond content: 95% by mass, Mooney viscosity $ML_{1+4}$ (100° C.): 45], 20 parts by mass of GECO [Epion (registered trademark)-301 manufactured by Daiso Co., Ltd.; EO/EP/AGE=73/23/4 (molar ratio)], were blended.

While masticating the total of 100 parts by mass of the rubber components using a Banbury mixer, the respective components besides the crosslinking component shown in Table 1 below were added and kneaded in, and thereafter the crosslinking component was added finally and further kneading was performed to prepare a rubber composition.

TABLE 1

| Component | Parts by mass |
| --- | --- |
| Sulfur-based crosslinking agent | 1.05 |
| Thiuram-based accelerator | 0.50 |
| Thiazole-based accelerator | 1.50 |
| Thiourea-based accelerator | 0.33 |
| Guanidine-based accelerator | 0.28 |
| Supplement accelerator | 5.0 |
| Filler I | 5.0 |
| Filler II | 2.0 |
| Acid accepting agent | 3.0 |

The respective components in Table 1 are as follows.

Sulfur-based crosslinking agent: Sulfur with 5% oil [manufactured by Tsurumi Chemical Industry Co., Ltd.]

Thiuram-based accelerator: Tetramethylthiuram monosulfide [Sanceler (registered trademark) TS manufactured by Sanshin Chemical Industry Co., Ltd.]

Thiazole-based accelerator: Di-2-benzothiazyl disulfide [product of the trade name, Sunsine MBTS, manufactured by Shandong Shanxian Chemical Co., Ltd.]

Thiourea-based accelerator: Ethylene thiourea [2-mercaptoimidazoline, Accel (registered trademark) 22-S manufactured by Kawaguchi Chemical Industry Co., Ltd.]

Guanidine-based accelerator: 1,3-di-o-tolylguanidine [Sanceler DT manufactured by Sanshin Chemical Industry Co., Ltd.]

Supplement accelerator: Two types of zinc oxide [manufactured by Mitsui Mining & Smelting Co., Ltd.]

Filler I: Carbon black FT [Asahi #15 manufactured by Asahi Carbon Co., Ltd.]

Filler II: Conductive carbon black [Denka Black (registered trademark) granular manufactured by Denki Kagaku Kogyo Kabushiki Kaisha]

Acid accepting agent: Hydrotalcite [DHT-4A (registered trademark)-2 manufactured by Kyowa Chemical Industry Co., Ltd.]

The parts by mass in the table are parts by mass with respect to the 100 parts by mass of the total amount of the rubber components.

(Manufacture of Semiconductive Roller)

After supplying the prepared rubber composition to an extrusion molder and performing extrusion-molding to a tubular shape with an outer diameter of 20 mmφ and an inner diameter of 7.0 mmφ, the tubular body was fitted onto a provisional shaft for crosslinking and crosslinked at 160° C.×1 hour in a vulcanizer.

The crosslinked tubular body was then refitted onto a shaft having an outer diameter of 7.5 mmφ and having a thermosetting adhesive with conductive property coated on its outer peripheral surface, and after adhering to the shaft by heating to 160° C. in an oven, both ends of the tubular body were cut. The outer peripheral surface of the tubular body was then traverse-polished using a cylindrical polisher and thereafter mirror polishing was performed as a finishing process to finish to an outer diameter of 16.00 mm (tolerance: 0.05) and thereby form a semiconductive roller integrated to the shaft.

After then rinsing the outer peripheral surface of the polished semiconductive roller with water, the roller was set in an ultraviolet ray irradiation apparatus [PL21-200 manufactured by Sen Lights Co., Ltd.] with the distance from the UV lamp to the outer peripheral surface being set to 5 cm. Ultraviolet rays of 184.9 nm and 253.7 nm wavelengths were irradiated for 5 minutes each while rotating the roller by 90° each around the shaft as the center to form an oxide film on the outer peripheral surface and thereby complete the semiconductive roller.

Example 2

Besides setting the BR blending amount to 70 parts by mass and the GECO blending amount to 30 parts by mass, a rubber composition was prepared and a semiconductive roller was manufactured in the same manner as in Example 1.

Example 3

Besides setting the BR blending amount to 50 parts by mass and the GECO blending amount to 50 parts by mass, a rubber composition was prepared and a semiconductive roller was manufactured in the same manner as in Example 1.

Example 4

Besides setting the BR blending amount to 30 parts by mass and the GECO blending amount to 70 parts by mass, a rubber composition was prepared and a semiconductive roller was manufactured in the same manner as in Example 1.

Comparative Example 1

Beside blending the same amount of acrylonitrile butadiene rubber [low-nitrile NBR, JSR N250SL, manufactured by JSR Corp.; bonded acrylonitrile amount: 20%, Mooney viscosity $ML_{1+4}$ (100° C.): 43] instead of BR, a rubber composition was prepared and a semiconductive roller was manufactured in the same manner as in Example 2.

<Charge Exchange Test>

(Preparation of Test Pieces)

Test pieces were prepared in accordance with the procedure described above using the same rubber compositions as those used in the examples and comparative examples.

The crosslinking conditions were 160° C.×60 minutes. As conditions for oxide film formation, the distance from the UV lamp to the surface of the test piece was 5 cm, the wavelengths of the irradiated ultraviolet rays were 184.9 nm and 253.7 nm, and the irradiation time was 48 seconds.

(Preparation of Toner Tablet)

A toner tablet was prepared according to the procedure described above using a positively-charged type, nonmagnetic, single-component toner for a commercially-sold laser printer with a printing speed of 26 pages per minute (26 ppm) and with which the set number of pages on which an image of 5% density can be formed continuously (printer life) is 2600 pages [A4 size, published value in Japanese Industrial Standards JIS X6932:2008].

(Charge Exchange Test)

The charge exchange test was performed to determine the equilibrium potential according to the procedure described above using the test pieces and the toner tablet. The toner charge amount of the semiconductive roller with respect to the toner was evaluated according to the following standards.

◯: The equilibrium potential is not less than 1.0 kV. The toner charge amount is satisfactory.

Δ: The equilibrium potential is not less than 0.3 kV and less than 1.0 kV. The toner charge amount is of an ordinary level.

x: The equilibrium potential is less than 0.3 kV. The toner charge amount is poor.

The results of the above are shown in Table 2.

TABLE 2

|  |  | Example 1 | Example 2 | Example 3 | Example 4 | Comparative Example 1 |
|---|---|---|---|---|---|---|
| Parts by mass | GECO | 20 | 30 | 50 | 70 | 30 |
|  | BR | 80 | 70 | 50 | 30 | — |
|  | NBR | — | — | — | — | 70 |
| Evaluation | Equilibrium potential (kV) | 3.19 | 3.15 | 2.57 | 1.52 | 0.01 |
|  | Toner charge amount | ◯ | ◯ | ◯ | ◯ | x |

From the results of Examples 1 to 4 and Comparative Example 1 shown in Table 2, it was found that by using just the two types of rubber of BR and epichlorohydrin rubber in combination as rubber components, the equilibrium potential can be increased and a semiconductive roller of high toner charge amount can be formed.

Also from the results of Examples 1 to 4, it was found that to improve the above effects further, the blending proportion of BR is preferably set to not less than 20 parts by mass and not more than 90 parts by mass in 100 parts by mass of the total amount of rubber components.

The invention claimed is:

1. A semiconductive roller comprising a crosslinked product of a rubber composition containing just the two types of rubber of butadiene rubber and epichlorohydrin rubber as rubber components,
   wherein a blending proportion of the butadiene rubber with respect to 100 parts by mass of the total amount of the rubber components is not less than 20 parts by mass and not more than 90 parts by mass, and
   wherein a blending proportion of the epichlorohydrin rubber with respect to 100 parts by mass of the total amount of the rubber components is not less than 10 parts by mass and not more than 80 parts by mass.

2. The semiconductive roller according to claim 1, wherein the butadiene rubber includes a high cis-butadiene rubber with a cis-1,4 bond percentage of not less than 90% by mass.

3. The semiconductive roller according to claim 1, wherein the butadiene rubber includes a high cis-butadiene rubber with a cis-1,4 bond percentage of not less than 90% by mass.

4. The semiconductive roller according to claim 1, wherein the epichlorohydrin rubber includes at least one of either of ECO and GECO, and
   the ethylene oxide content of the ECO and the GECO is not less than 30 mole % and not more than 95 mole %.

5. The semiconductive roller according to claim 3, wherein the epichlorohydrin rubber includes at least one of either of ECO and GECO, and
   the ethylene oxide content of the ECO and the GECO is not less than 30 mole % and not more than 95 mole %.

6. The semiconductive roller according to claim 1, having a non-porous, single-layer structure.

7. The semiconductive roller according to claim 1, comprising an outer peripheral surface on which an oxide film is formed.

8. The semiconductive roller according to claim 1 that is used as a developing roller incorporated in an image forming apparatus using an electrophotographic method and arranged to develop an electrostatic latent image, formed on a surface of a photoreceptor, into a toner image by means of a positively-charged type, nonmagnetic, single-component toner.

9. The semiconductive roller according to claim 8, wherein an equilibrium potential is not less than 0.3 kV, and
   the equilibrium potential is a surface potential of a toner tablet as when the toner tablet formed by pressing the toner and being adjusted to a predetermined value in surface potential is brought into contact with a test piece including the crosslinked product of the rubber composition at a contact pressure of 10N for 30 seconds and then released, a charge transfer amount from the test piece to the toner tablet is 0 nC.

10. The semiconductive roller according to claim 9, wherein the equilibrium potential is not less than 1.5 kV and not more than 3.5 kV.

* * * * *